(12) United States Patent
Curtis et al.

(10) Patent No.: US 6,338,086 B1
(45) Date of Patent: *Jan. 8, 2002

(54) COLLABORATIVE OBJECT ARCHITECTURE

(75) Inventors: Pavel Curtis, Los Altos Hills; Michael D. Dixon, Palo Alto; David A. Nichols, Mountain View, all of CA (US)

(73) Assignee: Placeware, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,101
(22) Filed: Jun. 11, 1998
(51) Int. Cl.$^7$ .............................................. G06F 15/16
(52) U.S. Cl. ..................... 709/218; 709/203; 709/205
(58) Field of Search ................................ 709/217, 218, 709/219, 220, 225, 232, 248, 201, 203, 204, 205, 206; 707/10, 102, 200, 201, 203; 345/330, 331, 332; 340/825.06, 825.2; 370/260, 270

(56) References Cited

U.S. PATENT DOCUMENTS

| 5,206,934 A |   | 4/1993 | Naef, III |
|---|---|---|---|
| 5,241,625 A | * | 8/1993 | Epard et al. ................. 395/502 |
| 5,541,911 A | * | 7/1996 | Nilakantan et al. ......... 370/422 |
| 5,613,124 A | * | 3/1997 | Atkinson et al. ............ 345/433 |
| 5,706,502 A | * | 1/1998 | Foley et al. .................... 707/10 |
| 5,794,219 A | * | 8/1998 | Brown ........................ 705/37 |
| 5,796,396 A | * | 8/1998 | Rich ............................ 345/332 |
| 5,812,749 A | * | 9/1998 | Fernandez et al. .............. 714/4 |
| 5,844,553 A | * | 12/1998 | Hao et al. .................... 345/329 |
| 5,890,963 A | * | 4/1999 | Yen .............................. 463/42 |

(List continued on next page.)

OTHER PUBLICATIONS

Sun Microsystems, Inc., "Java Card 2.0: Programming Concepts", Revision 1.0 Final, java.sun.com, pp. 1–33, Oct. 1997.*

International Preliminary Search Report dated Mar. 30, 2000 for corresponding application No. PCT/US(9/13158 (7 pages).

Avrahami, Gideon, et al., "A Two–View Approach to Constructing User Interfaces," Computer Graphics, Jul. 1989, pp. 137–146.

Bartlett, Joel, "Don't Fidget with Widgets, Draw!" Proceedings 6th Annual X Technical Conference, Jan. 13–15, 1992, pp. 117–131.

Bharat, Krishna, et al., "Building Distributed, Multi–User Applications by Direct Manipulation," Proceedings of the ACM Symposium on User Interface Software and Technology, Nov. 2–4, 1994, pp. 71–81.

(List continued on next page.)

*Primary Examiner*—Zarni Maung
*Assistant Examiner*—Jason D. Cardone
(74) *Attorney, Agent, or Firm*—Finnegan, Henderson, Farabow, Garrett & Dunner, LLP

(57) ABSTRACT

A collaborative object architecture with one or more of the following technologies: 1) lightweight asynchronous messaging; 2) collaborative objects; 3) optimistic concurrency control; and 4) transparent object serialization. Lightweight asynchronous messaging allows highly responsive interactivity and natural interactions with minimal network loads. Collaborative objects allow ubiquitous sharing and provides each user with the same copy of the shared object. Optimistic concurrency control allows full-duplex group editing and natural interactions. Transparent object serialization provides real world persistence and support for asynchronous changes. Thus, combination of these technologies provides a collaborative object architecture with several advantages over the prior art.

13 Claims, 9 Drawing Sheets

U.S. PATENT DOCUMENTS

| | | | | |
|---|---|---|---|---|
| 5,907,598 A | * | 5/1999 | Mandalia et al. | 379/100.01 |
| 5,916,302 A | * | 6/1999 | Dunn et al. | 709/204 |
| 5,918,229 A | * | 6/1999 | Davis et al. | 707/10 |
| 5,922,044 A | * | 7/1999 | Banathia | 709/203 |
| 5,924,116 A | * | 7/1999 | Aggarwal et al. | 711/122 |
| 5,935,249 A | * | 8/1999 | Stern et al. | 713/201 |
| 5,944,791 A | * | 8/1999 | Scherpbier | 709/218 |
| 5,959,621 A | * | 9/1999 | Nawaz et al. | 345/329 |
| 5,964,660 A | * | 10/1999 | James et al. | 463/1 |
| 5,974,441 A | * | 10/1999 | Rogers et al. | 709/200 |
| 6,018,343 A | * | 1/2000 | Wang et al. | 345/356 |
| 6,023,685 A | * | 2/2000 | Brett et al. | 705/37 |
| 6,029,175 A | * | 2/2000 | Chow et al. | 707/104 |
| 6,044,205 A | * | 3/2000 | Reed | 709/201 |
| 6,044,218 A | * | 3/2000 | Faustini | 717/2 |
| 6,065,051 A | * | 5/2000 | Steele et al. | 790/219 |
| 6,075,863 A | * | 6/2000 | Krishnan et al. | 713/191 |
| 6,094,673 A | * | 7/2000 | Dilip et al. | 709/202 |
| 6,108,687 A | * | 8/2000 | Craig | 709/203 |
| 6,195,685 B1 | * | 2/2001 | Mukherjee et al. | 709/205 |

OTHER PUBLICATIONS

Brown, Marc H., et al., "MMConf: An Infrastructure for Building Shared Multimedia Applications," Proceedings of the Conference on Computer–Supported Cooperative Work, Oct. 7–10, 1990, pp. 329–342.

Curtis, Pavel, et al., "Lambda MOO Programmer's Manual," Lambda MOO Version 1.8.0p5, May 1996.

Curtis, Pavel, et al., "MUDs Grow Up: Social Virtual Reality in the Real World," Xerox PARC, May 5, 1993.

Curtis, Pavel, et al., "The Jupiter Audio/Video Architecture: Secure Multimedia in Network Places," ACM Multimedia 95, pp. 79–90.

Danskin, John M., "Previewing PostScript over a Telephone in 3 Seconds Per Page," Proceedings 9th Annual X Technical Conference, Jan. 30–Feb. 1, 1995, pp. 23–40.

Danskin, John, "Higher Bandwidth X," Proceedings ACM Multimedia '94, Oct. 15–20, 1994, pp. 89–96.

Dewan, Prasun, et. al., "Primitives for Programming Multi–User Interfaces," Proceedings of the ACM Symposium on User Interface Software and Technology, Nov. 11–13, 1991, pp. 69–78.

Ellis, C. A., et al., "Concurrency Control in Groupware Systems," Proceedings of the 1989 ACM SIGMOD International Conference on the Management of Data Portland, Oregon, Jun. 1989, pp. 399–407.

Fulton, Jim, et al., "An Update on Low Bandwidth X (LBX) A Standard for X and Serial Lines," Proceedings 7th Annual X Technical Conference, Jan. 18–20, 1993, pp. 251–266.

Gibbs, S.J., "LIZA: An Extensible Groupware Toolkit," 'Wings for the Mind' Conference Proceedings, Apr. 30–May 4, 1989, pp. 29–35.

Karsenty, Alain, et al., "An Algorithm for Distributed Groupware Applications," Proceedings The 13th International Conference on Distributed Computing Systems, May 25–28, 1993, pp. 195–202.

Knister, Michael, et al., "Issues in the Design of a Toolkit for Supporting Multiple Group Editors," Computing Systems, Spring 1993, pp. 135–166.

Packard, Keith "Designing LBX An Experiment Based Standard," Proceedings 8th Annual X Technical Conference, Jan. 24–26, 1994, pp. 121–133.

Patet, Dorab, et al., "A UNIX Toolkit for Distributed Synchronous Collaborative Applications," Computing Systems, Spring 1993, pp. 105–133.

Patterson, John F., et al., "Rendezvous: An Architecture for Synchronous Multi–User Applications," Proceedings of the Conference on Computer–Supported Cooperative Work, Oct. 7–10, 1990, pp. 317–328.

Pike, R., "The Blit: A Multiplexed Graphics Terminal," AT&T Bell Laboratories Technical Journal Computing Science and Systems, Oct. 1984, pp. 1607–1631.

Pike Rob, "The Text Editor sam," Software–Practice and Experience, Nov. 1987, pp. 813–845.

Roseman, Mark, et al., "GroupKit A Groupware Toolkit for Building Real–Time Conferencing Applications," Proceedings of the Conference on Computer–Supported Cooperative Work, Oct. 31–Nov. 4, 1992, pp. 43–50.

* cited by examiner

COLLABORATIVE OBJECT ARCHITECTURE

FIELD OF THE INVENTION

The present invention relates to multi-user computer applications. More specifically, the present invention relates to a collaborative object architecture for use with networked computers.

BACKGROUND OF THE INVENTION

Advances in computer technology and the advent of the Internet have enabled geographically distributed computer users to execute computer programs from points around the world. Examples of distributed programs include computer chat rooms, conferencing programs and gaming programs, each of which allow multiple computer users to interactively exchange information in real time. For instance, a computer chat room can allow a number of distributed users to view conversational text as it is typed by any one of the individual users, a conferencing application may allow geographically distributed users to collectively draft and edit a single text document, and gaming programs can allow multiple users to compete or collaborate in a virtual gaming environment.

In order to perform distributed programming, it is necessary for two individual processes to maintain a bi-directional communication stream. The term "process" refers to an active execution of a computation, and is also commonly referred to as a task, job, or thread. Distributed programming is frequently based on the client-server paradigm, wherein a process executing on a client system communicates with a process executing on a server system.

In the client-server paradigm, a client process makes requests for access to, and information from, a server process. A client process and server process can be executing on the same computer system or they can be executing on separate networked systems. In an architecture where a server is accessible by a network, such as the Internet, a large number of client systems from around the world can make requests on a server system.

Distributed programs, however, typically are only distributed to the extent that multiple client systems have access to a program running on a server system that operates with request and wait remote procedure calls (RPCs). In these architectures, the client systems request a service from the server system and wait for a response before proceeding. Such architectures require substantial network resources to keep the client systems updated with changes to the program. As the number of users increases network and other computing resources required to provide satisfactory performance also increases. For these reasons, prior art distributed programs typically do not provide a scalable, near real time collaborative environment.

What is needed is an improved architecture that provides objects distributed among multiple computer systems that act as a single object.

SUMMARY OF THE INVENTION

A collaborative object architecture is described. A pod application runs on a server computer system. Applets run on one or more client computer systems coupled to the server computer system via a network. Each pod and a corresponding applet on each client computer system comprises a collaborative object. In one embodiment, pods have multiple constituent parts having corresponding constituent parts in each corresponding applet. Changes generated by a constituent part in an applet are processed locally and communicated to the pod. The applet continues normal operation without waiting for a response from the pod. When the pod receives the changes, the corresponding constituent part processes the changes and communicates the changes to the applets that have not processed the changes. In one embodiment, multiple changes are communicated in a single message packet.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

A collaborative object architecture is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Briefly, the present invention provides a collaborative object architecture with one or more of the following: 1) lightweight asynchronous messaging; 2) collaborative objects; 3) optimistic concurrency control; and 4) transparent object serialization. Lightweight asynchronous messaging allows responsive interactivity and natural interactions with minimal network loads. Collaborative objects allow ubiquitous sharing and provides each user with the same copy of a shared object. Optimistic concurrency control allows full-duplex group editing and natural interactions. Transparent object serialization provides real world persistence and support for asynchronous changes. Thus, combination of these features provides a persistent collaborative-object messaging architecture with several advantages over the prior art.

Overview of a Collaborative Object Architecture

Figure 1:
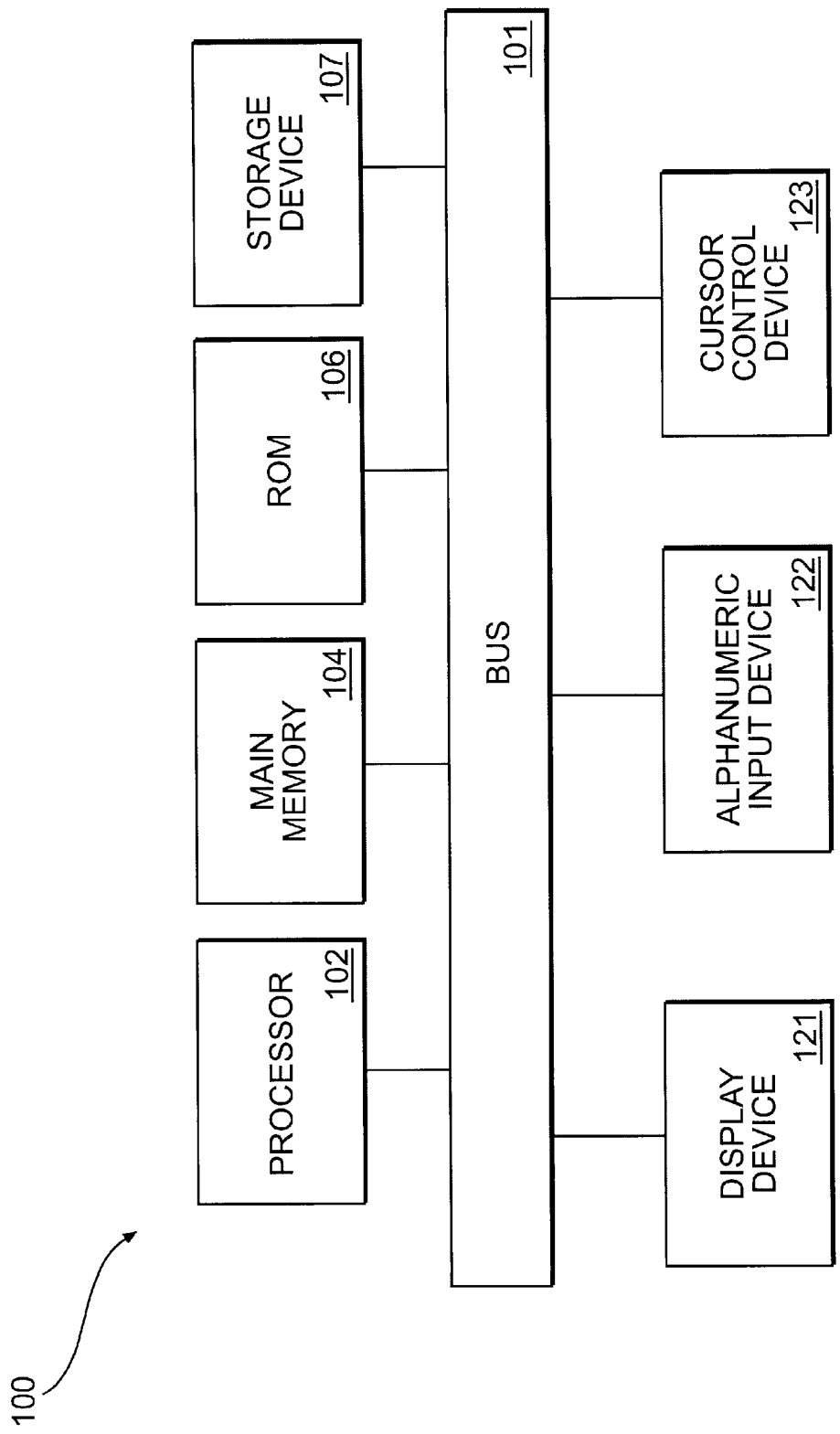
FIG. 1 is one embodiment of a computer system.

FIG. 1 is one embodiment of a computer system. Computer system 100 includes bus 101 or other communication device for communicating information, and processor 102 coupled with bus 101 for processing information. Computer system 100 may also include multiple processors (not shown in FIG. 1). Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also includes read only memory (ROM) and/or other static storage device 106 coupled to bus 101 for storing static information and instructions for processor 102. Data storage device 107 is coupled to bus 101 for storing information and instructions.

Data storage device 107 such as a magnetic disk or optical disc and its corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

Figure 2:
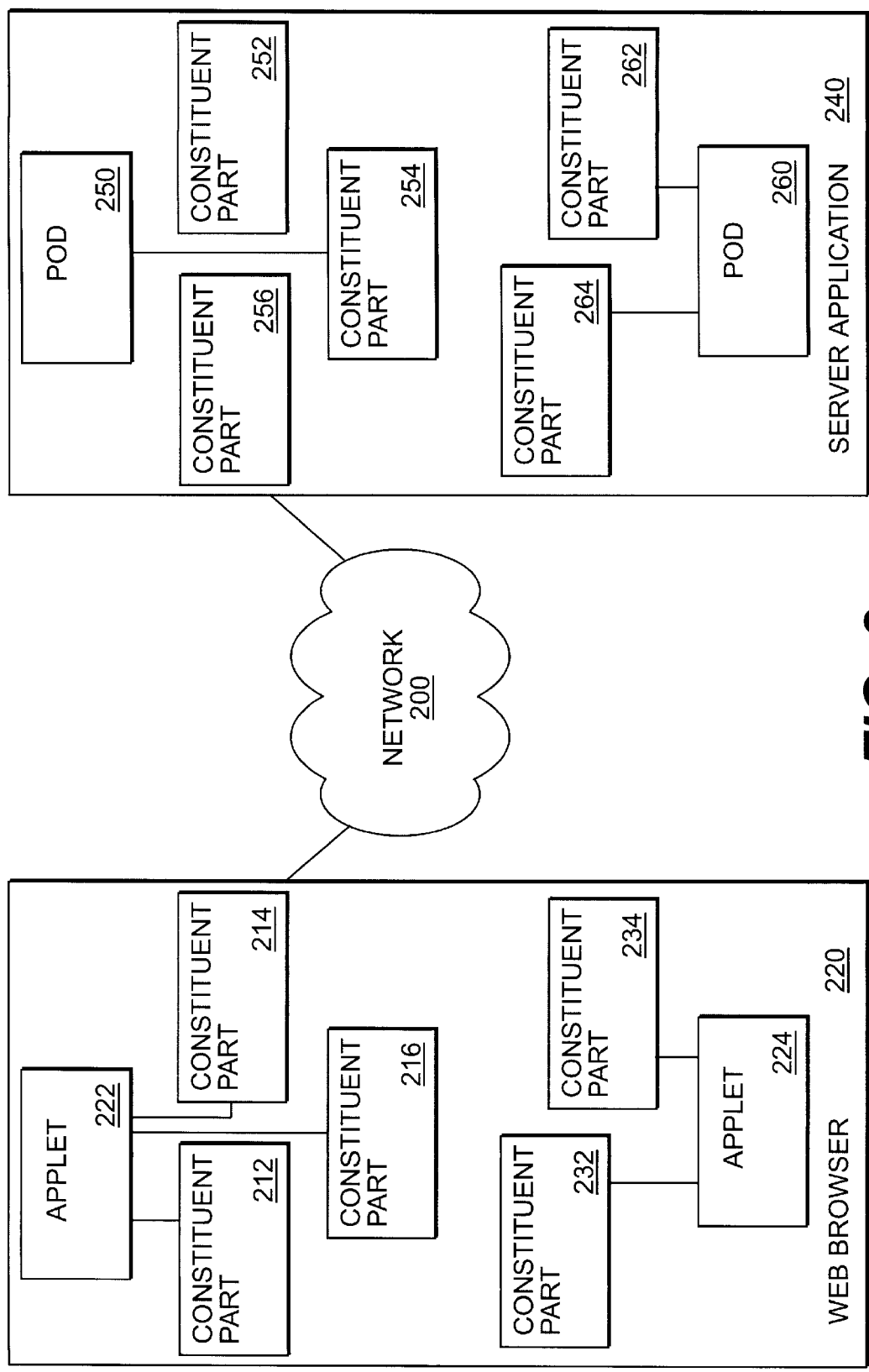
FIG. 2 is one embodiment of a collaborative object architecture.

FIG. 2 is one embodiment of a collaborative object architecture. In one embodiment, each data set (or object) within the architecture has two distinct parts: one part that runs on a single server computer system and one or more copies of the second part that run on separate client computer systems, each of which connect to the server computer system via a network. The phrase "data set" refers to a broad category of objects including, but not limited to, applications, files, etc.

For purposes of explanation herein, individual client parts of each application are called "applets." In one embodiment, applets run in a Web browser, such as Internet Explorer® available from Microsoft Corporation of Redmond, Washington or Navigator® available from Netscape Communications, Inc. of Mountain View, Calif. Alternatively, the applet can run in a different web browser or as a standalone application. In one embodiment, applets are built of classes defined by the Java™ Programming Language available from Sun Microsystems of Mountain View, Calif.; however, any programming language can be used.

In alternative embodiments, applets are standalone applications (client applications) rather than applets running in a Web browser. In such embodiments, the client applications are installed in a client computer system prior to communication with a server.

When a server application is running on a server computer system, the server accepts connections from clients and activates or deactivates server-side applications in response to the connections. For explanation purposes herein, the server half of an application is referred to as a "pod." The server also maintains the persistent state of the pods.

A server provides an environment in which pods can run and receive connections from corresponding applets. In one embodiment, the server responds to TCP or HTTP connections made by client-side messaging substrate(s) and generates a sub-connection to an appropriate pod. It is important to note that any type of communication protocol that provides reliable, ordered communications can be used to implement the present invention.

Each collaborative object includes multiple constituent parts including a pod and one or more applets distributed across multiple computer systems. Applets and pods can be further subdivided into constituent sub-parts, which interact to provide collaborative sub-objects. Sub-parts can be further subdivided into multiple levels of sub-parts each of which interact with corresponding sub-parts to provide multiple levels of collaborative sub-objects. The relationship of constituent parts across multiple computer systems and the hierarchical relationship of sub-parts is described in greater detail below.

Network 200 provides an interconnection between multiple computer systems that operate as client computer systems and/or server computer systems. Network 200 can be any type of computer network. In one embodiment, network 200 is the Internet. Alternatively, network 200 can be local-area network (LAN), a wide-area network (WAN), etc.

FIG. 2 describes a single server communicating with to a single web browser via network 200 for simplicity. Any number of web browsers and any number of servers can be interconnected via network 200 and additional networks (not shown in FIG. 2); however, collaborative objects operate between a single server and multiple clients. In one embodiment, the network connection provides an applet with a bi-directional communication channel with the corresponding pod. In one embodiment, the communication takes the form of asynchronous remote procedure calls (RPCs) made by each side to the other.

Web browser 220 runs on a client computer system (not shown in FIG. 2) that provides computing resources for web browser 220. Similarly, server application 240 runs on a server computer system (not shown in FIG. 2) that provides computing resources for server application 240. The particular environment in which applets and pods run may be varied and is not central to the present invention.

Web browser 220 runs one or more applets, such as applet 222 and applet 224. In one embodiment, each applet can be further subdivided into multiple constituent parts, such as constituent parts 212, 214, 216, 232 and 234. Constituent parts can be, for example, a shared string, a shared integer, etc.

Server 240 runs one or more pods, such as pods 250 and 260. In one embodiment, each pod can be further subdivided into multiple constituent parts that correspond to respective constituent parts of applets running in web browser 220 or other web browsers (not shown in FIG. 2). For example, pod 250 corresponds to applet 222 and the three constituent parts of pod 250 (e.g., 252, 254 and 256) correspond to the three constituent parts (e.g., 212, 214 and 216) of applet 210. Similarly, the two constituent parts of pod 260 (e.g., 262 and 264) correspond to the two constituent parts of applet 224 (e.g., 232 and 234).

Communication between applets and corresponding pods occur over network 200. The network connection provides applets with a bi-directional communication channel with the corresponding pod. In one embodiment, the communication takes the form of asynchronous remote procedure calls (RPCs) made by each side to the other. Asynchronous communication is described in greater detail below.

Lightweight Asynchronous Messaging

In one embodiment, pods and applets communicate via a messaging substrate. The messaging substrate is an optimized facility designed specifically to support interactive distributed applications running on any network. The messaging substrate is designed for performance using high-latency networks by using small messages to reduce bandwidth requirements.

Network interactions are generally subject to two sources of response latency. The first source of response latency is caused by sequential processing of events by a pod. Sequential processing refers to ordering of events that occur simultaneously or are received simultaneously by the pod. The second source of response latency is high-latency communications paths. For example, low-bandwidth connections, busy networks, and high-latency links introduce delays to responses from other devices.

In one embodiment, asynchronous lightweight messaging allows applets to continue operation without waiting for a response from the corresponding pod. Thus, unlike rigid "call and return" messaging, applets are not left idle waiting for pod response. Similarly, pods continue local operations without waiting for the applet to respond. Thus, both the pod and the applet can continue operations without waiting for a response from the other device, thereby improving interactivity of distributed applications.

In order to properly implement asynchronous lightweight messaging, the underlying transport protocol must be reliable and provide ordered delivery. In other words, messages sent by an applet are received by a corresponding pod in the same order in which the messages were sent. In one embodiment, TCP is used for messaging purposes; however, any protocol that provides reliable, ordered delivery of messages can be used.

Figure 3:
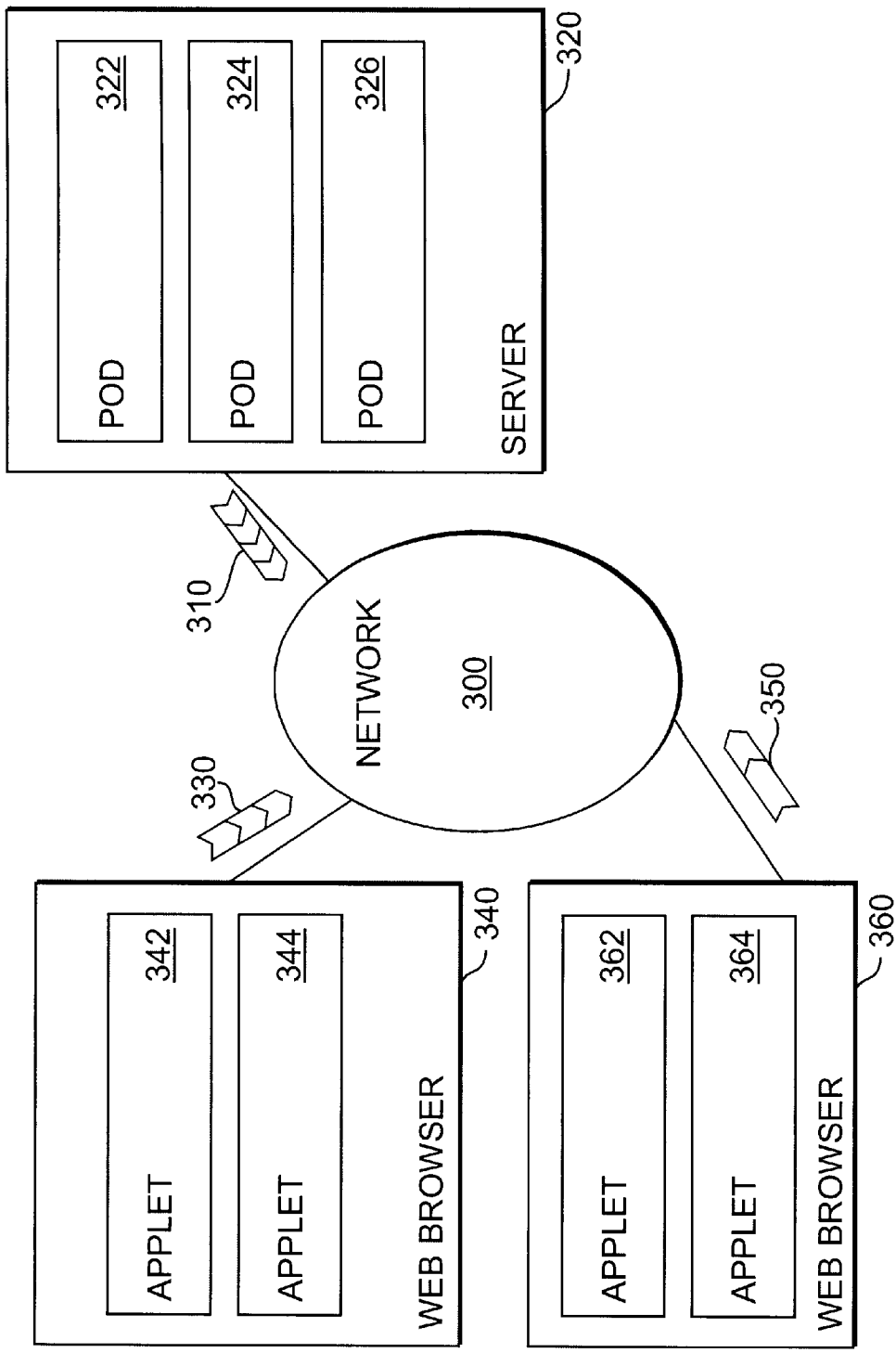
FIG. 3 is one embodiment of a conceptual diagram of lightweight asynchronous messaging.

FIG. 3 is one embodiment of a conceptual diagram of lightweight asynchronous messaging. Network 300 provides interconnection between server 320, web browser 340 and web browser 360. Pods 322, 324 and 326 run in server 320. Applets 342 and 344 run in web browser 340. Similarly, applets 362 and 364 run in web browser 360.

Message bursts generated by the web browsers and the server can include multiple messages. For example, message burst 350 includes two messages generated by an applet running in web browser 360. The term "message bursts" refers to any grouping of messages sent across a network, regardless of network protocol and packet format. Message burst 330 includes three messages generated by an applet running in web browser 340. Pods communicate messages in a similar manner. For example, message burst 310 includes four messages from a pod running in server 320.

In one embodiment, compact representations are used to reduce the amount of data included in each message. For example, if an integer is less than 256, the number is sent as one byte of data. Larger integers are sent as larger blocks of data. Similar compact representations are used for other data. In this manner messages are optimized to reduce the non-essential data included in each message. Lightweight messaging allows small change information to be sent frequently. This makes the collaborative object appear more "live" because the user receives better feedback. Lightweight messaging is also beneficial for use with high-latency networks such as the Internet for the same reason.

As described above, multiple messages can be bundled into a single message burst. For example, multiple messages can be included in a single TCP packet or HTTP request. The asynchronous nature of messaging provided by the present invention allows message bundling because a sending object is not required to wait for a response from the receiving object. In a call and return architecture only a single message can be sent because the sending object cannot proceed without a response from the receiving object.

In one embodiment, a single TCP connection is shared between all applets running on a single browser and a corresponding server application running corresponding pods. The constituent sub-parts of an applet communicate with the corresponding constituent sub-parts of a pod over the shared connection.

Collaborative Objects

Collaborative objects refers to many constituent parts on many hosts that act as a single object. As discussed above, each object has a server side (pod) and one or more client sides (applets). Each pod and/or applet can be further sub-divided into constituent parts that communicate with corresponding constituent parts. In one embodiment, constituent parts are chosen from a library of constituent parts; however, custom constituent parts can be designed.

The library of constituent parts can provide lower-level functionality, such as constituent parts that manipulate strings, numerical values, etc. Higher-level collaborative objects can be built from the lower-level collaborative objects included in the library. For example, a database query higher-level collaborative object can include multiple string objects and multiple integer objects. The database query object can then be shared by multiple applets and a corresponding pod.

Collaborative objects also provide an applet with more local intelligence than prior art shared objects operating with a call and return protocol. An applet can provide local processing of shared objects without the need of communicating with the pod. For example, an applet can search a local copy of a collaborative string object to determine whether a particular sub-string exists without communicating a search request to the pod. Thus, applet operations do not necessarily correspond with remote procedure calls.

Figure 4:
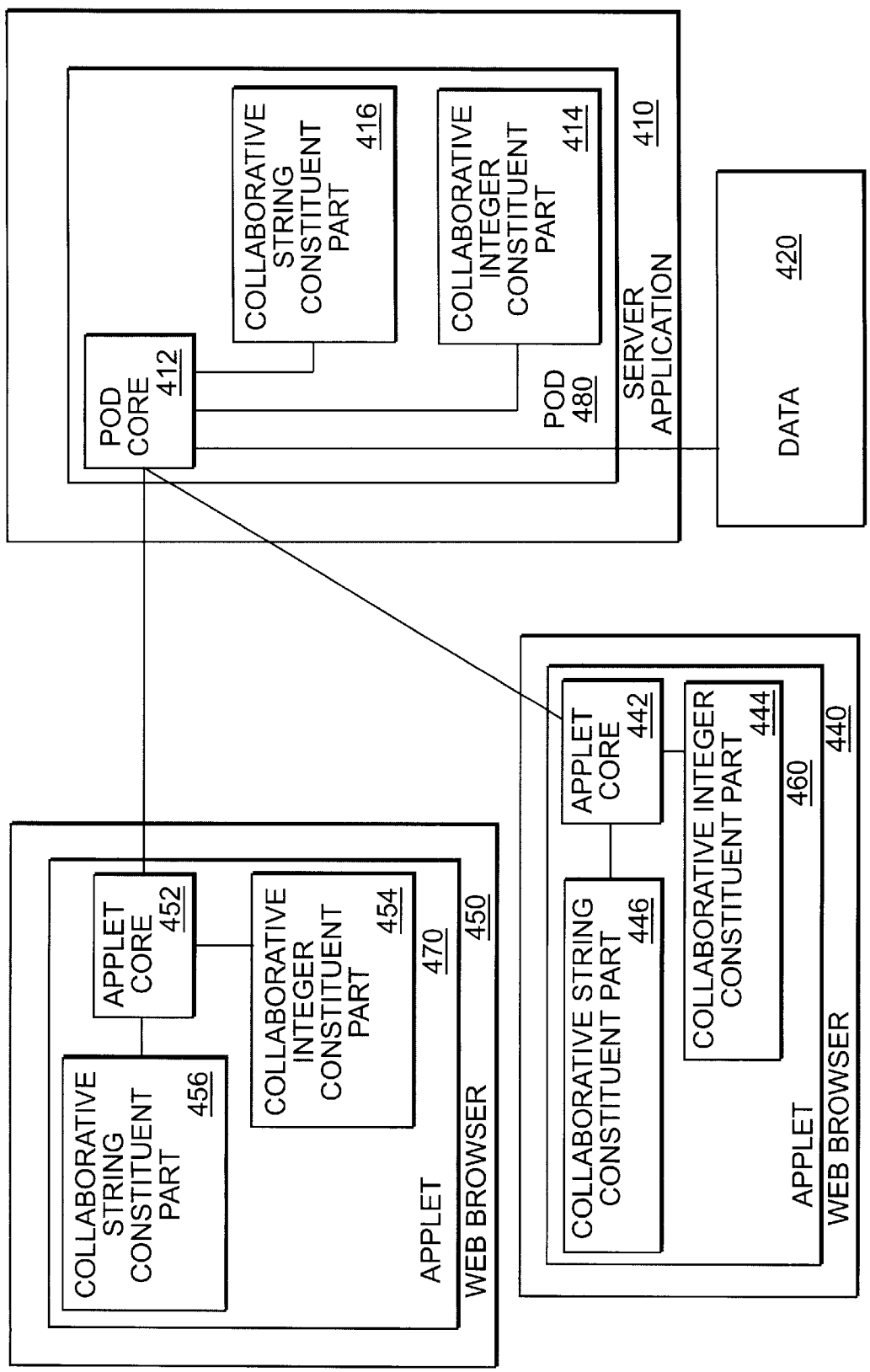
FIG. 4 is one embodiment of a distributed database having collaborative objects.

FIG. 4 is one embodiment of a distributed database having collaborative objects. In the example of FIG. 4, the collaborative object is a database; however, collaborative objects can operate on any set of data, whether executable or not. Constituent parts of the collaborative object can be used, for example, to author queries, modify data, etc.

Server application 410 runs a pod that consists of pod core 412, collaborative integer constituent part 414 and collaborative string constituent part 416. Pod core 412 has access to data 420 that is not a part of server application 410. As described in greater detail below, applets do not directly intercommunicate. Applets send messages to a corresponding pod and the pod manages coordination of collaborative objects.

Web browser 450 runs applet 470 that includes applet core 452, collaborative integer constituent part 454 and collaborative string constituent part 456. Similarly, Web browser 440 runs applet 460 that includes applet core 442, collaborative integer constituent part 444 and collaborative string constituent part 446. In one embodiment, the collaborative string constituent parts and the collaborative integer constituent parts are multiple instances of objects defined by the object library.

In one embodiment, pod core 412, applet core 442 and applet core 452 provide code sequences to manage communications between the pod/applet over shared TCP connections. For purposes of explanation with respect to FIG. 4, the core components include the messaging substrate described above. In one embodiment, the constituent parts that are included in pods and applets communicate with corresponding constituent parts in the manner described above in more general terms with respect to applets and pods.

Collaborative string constituent parts 416, 446 and 456 are corresponding constituent parts that provide a collaborative string object used to define a query into the database to retrieve data from data 420. When a user of web browser 450 writes a query using a keyboard or other input device (not shown in FIG. 4), the query is input to a user interface (not shown in FIG. 4) of web browser 450. The user interface communicates the query to collaborative string constituent part 456 that modifies a local copy of the string. Collaborative string constituent part 456 then communicates the query to collaborative string constituent part 416. In one embodiment, the query is communicated as part of a message burst between applet 470 and pod 480.

Collaborative string constituent part 416 updates the server-side local version of the string in response to the message received from applet 470. Coordination of messages between multiple applets and a corresponding pod is described in greater detail below. Collaborative string constituent part 416 then communicates the query to collaborative string constituent part 446 that is part of applet 460, as well as to any other corresponding applets (not shown in FIG. 4). Collaborative string constituent part 446 changes the local copy of the string and communicates the string to the user interface (not shown in FIG. 4) of Web browser 440.

In one embodiment, communications occur directly between the constituent parts of a collaborative object. The corresponding pod and applets do not manage communications or updates to data controlled by the constituent parts. In this manner, constituent parts of applets and pods as well as constituent sub-parts along with corresponding parts or sub-parts operate as collaborative objects or collaborative sub-objects, without management by the higher-level applets and pod. By providing independent objects operating together to form a higher level applet or pod, the present invention allows use of asynchronous communications between parts to provide a more responsive architecture than prior art shared object architectures.

The user of web browser 440 can also make modifications to the string to change the database query. Any changes to the string are processed in the same manner as the original query described above. Of course, other constituent parts can be used to provide different data in a similar manner. For example, collaborative integer constituent parts 414, 444 and 454 can be used for communicating other data between within collaborative objects, for example, updating data 420.

Constituent parts can be further subdivided into multiple constituent sub-parts or larger collaborative objects can be built from constituent parts (not shown in FIG. 4). For example, collaborative string constituent part 416 and collaborative integer constituent part 414 together can define a database query pod constituent part. The corresponding applet constituent parts define respective database query applet constituent parts. Together the constituent parts provide a database query collaborative object. Constituent sub-parts communicate directly with corresponding constituent sub-parts in the same manner as the constituent parts described above.

Because objects and sub-objects communicate using lightweight asynchronous messaging, changes to an object are made without update and coordination with other objects of the same applet. For example, changes to collaborative integer constituent part 444 can be communicated after changes to collaborative string constituent part 446 are communicated, but before the pod has completed processing of the changes to collaborative string constituent part 446. This allows a user to continue to use an applet without having to wait for processing of previous changes to be completed.

Transparent Object Serialization

As used herein, "serialization" refers to the process of transforming a complex data set (e.g., a database) into a linear data set that can be stored on data storage device (e.g., a hard disk). In one embodiment, object serialization is used to provide persistence for collaborative objects.

According to one embodiment of the present invention, unless active, pods reside on a hard disk or other storage device in the server computer system. When a connection is received for an inactive pod stored on a hard disk, the server computer system loads the pod into main memory and restores the state of the pod as of the last time the pod was active. The server then delivers the incoming messages to the active pod.

In one embodiment, when the pod's messages have been processed and the pod is no longer active, the server saves the state of the pod, moves the pod to hard disk or other storage device and clears the pod from main memory. By having the pod in main memory only when connections are open to the pod, a server computer system can support a large number of pods without using correspondingly large amounts of memory. Thus, pods consume resources of the server computer system only when active and being used by clients.

Periodic serialization can initiated to maintain persistence for collaborative objects. In one embodiment, servers serialize objects that have been active for a preselected period of time without serialization. Periodic serialization allows the state of the pod to be saved when the pod is active so that the state can be retrieved should an event occur that would cause the pod to lose data, such as the server computer system crashing. In order to coordinate the state of the pod with the stored state, periodic serialization should occur between messages.

Optimistic Concurrency Control

In general, two types of concurrency control (e.g., pessimistic and optimistic) and two types of collaborative architectures (e.g., centralized and distributed) can be provided, which results in four choices for concurrency control. Pessimistic concurrency control requires communication with other systems (e.g., a server) before changing locally (e.g., the client). Optimistic concurrency control, on the other hand, does not require communications before making a local change. Optimistic algorithms are well-suited for high-latency comminations because the result of a user's action can be displayed before an associated message makes a round-trip between the applet and the server.

In distributed architectures, applets communicate with other applets to provide concurrency control. In centralized architectures, applets communicate with pods and the pods provide concurrency control. Because of the many possible messages required, distributed optimistic concurrency control can become complex very rapidly as applets are added to the architecture. The increased complexity increases network resources required to provide concurrency control between applets. One embodiment of optimistic concurrency control is described in detail in a paper entitled "HIGH-LATENCY, LOW-BANDWIDTH WINDOWING IN THE JUPITER COLLABORATION SYSTEM" published in the Proceedings of the Eighth Annual Symposium on User Interface Software and Technology (UIST), Nov. 15–17, 1995. As described in greater detail below, the present invention provides a centralized architecture with optimistic concurrency control.

In one embodiment of the present invention, optimistic concurrency control is provided only for individual applet-pod links. In this manner, each applet appears to operate synchronously with respect to the pod. The pod can use a change propagation algorithm to update all applets and thereby provide concurrency control between applets. In one embodiment, if either the applet or the pod initiates a change to data, the change is applied locally and a message describing the change is sent to the other party.

As discussed earlier, optimistic concurrency control allows applets to change data without having to wait for pod interaction. If either the applet or the pod initiates a change, the change is immediately applied locally and a message is sent to the corresponding party. When messages cross in the network, each receiver modifies the incoming message so that the message makes sense relative to the receiving object's current state. Modifying conflicting messages is described in greater detail below.

Concurrency control is not applied directly between applets, instead concurrency control is applied between a pod and a single applet as messages are received from the individual applets. Changes are then broadcast to the other corresponding applets. In this manner, a two-way optimistic concurrency control algorithm can be applied to an n-way collaborative object architecture, which is much simpler than implementing the n-way optimistic concurrency control.

Figure 5:
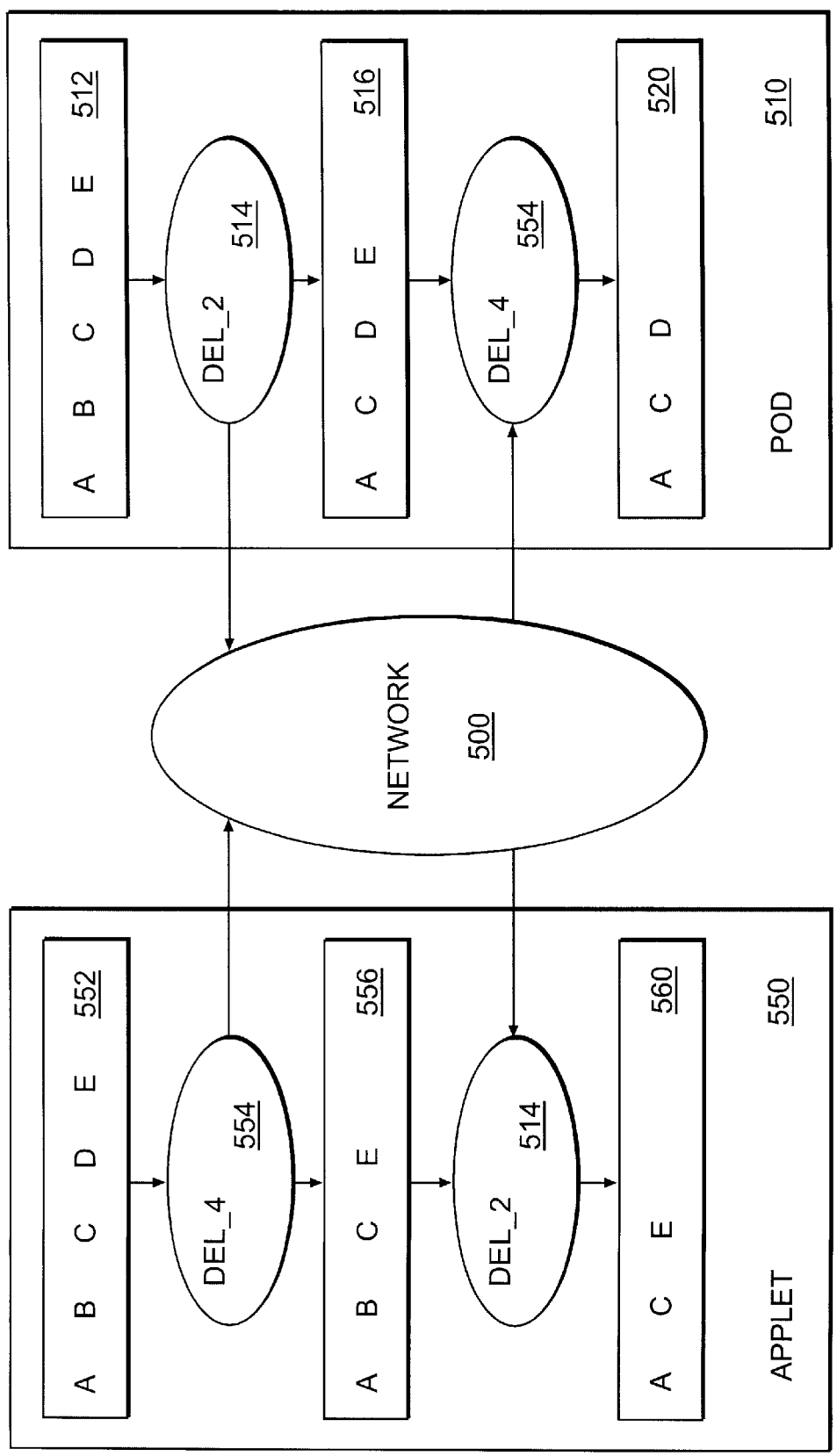
FIG. 5 is one embodiment of two messages of a single string object that cross in a network.

FIG. 5 is one embodiment of two messages of a single string object that cross in a network. The example of FIG. 5 is an update conflict that results in an incorrect update. Concurrency control of the present invention allows collaborative objects to recognize the conflict and modify messages when necessary to avoid such conflicts.

If the messages of FIG. 5 are not transformed on receipt, the final values in applet 550 and pod 510 are different. The original strings, string 552 in applet 550 and string 512 in pod 510 are the same ("ABCDE"). The user of applet 550 deletes "D" and applet 550 generates DEL__4 message 554 in response to delete the fourth letter in string 552, which results in string 556 ("ABCE"). DEL__4 message 554 is communicated to pod 510 via network 500.

Prior to pod 510 processing DEL__4 message 554 from applet 550, a user of pod 510 deletes "B" and pod 510 generates DEL__2 message 514 in response to delete the second letter in string 512, which results in string 516 ("ACDE"). DEL__2 message 514 is then communicated to applet 550 via network 500. Prior to processing the delete messages, string 556 in applet 550 includes "ABCE" and string 516 in pod 510 includes "ACDE".

When pod 510 processes DEL__4 message 554, the fourth letter in the string ("E") is deleted to result in string 520 ("ACD"). Similarly, when applet processes DEL__2 message 514, the second letter in the string ("B") is deleted to result in string 560 including "ACE". Thus, without concurrency control, the final string in applet 550 and pod 510 do not match.

Concurrency control according to the present invention modifies DEL__4 message 554 from applet 550 to a DEL__3 message to delete "D" from string 516 instead of deleting "E". As described below, the architecture of the present invention includes concurrency control to handle update conflicts so that pods and corresponding applets have the same data when all appropriate message have been processed.

A general tool for handling update conflicts is described as the XFORM function. The XFORM function is intended to describe a broad category of functions that have the properties that are described below. In the following description

XFORM(A, P) ={A', P'}, where A and P refer to the original applet and pod messages, respectively. Messages A' and P' have the property that if the applet applies A followed by P', and the pod applies P followed by A', the applet and the pod will be in the same state.

In the update conflict example of FIG. 5, the following transform is an example of the transform that can be applied.

XFORM(del x, del y)={del x−1,del y} if x>y;

{del x, del y−1} if x<y;

and

{no-op, no-op} if x=y.

In other words, later indexes in a string are modified to account for earlier deletions.

Figure 6:
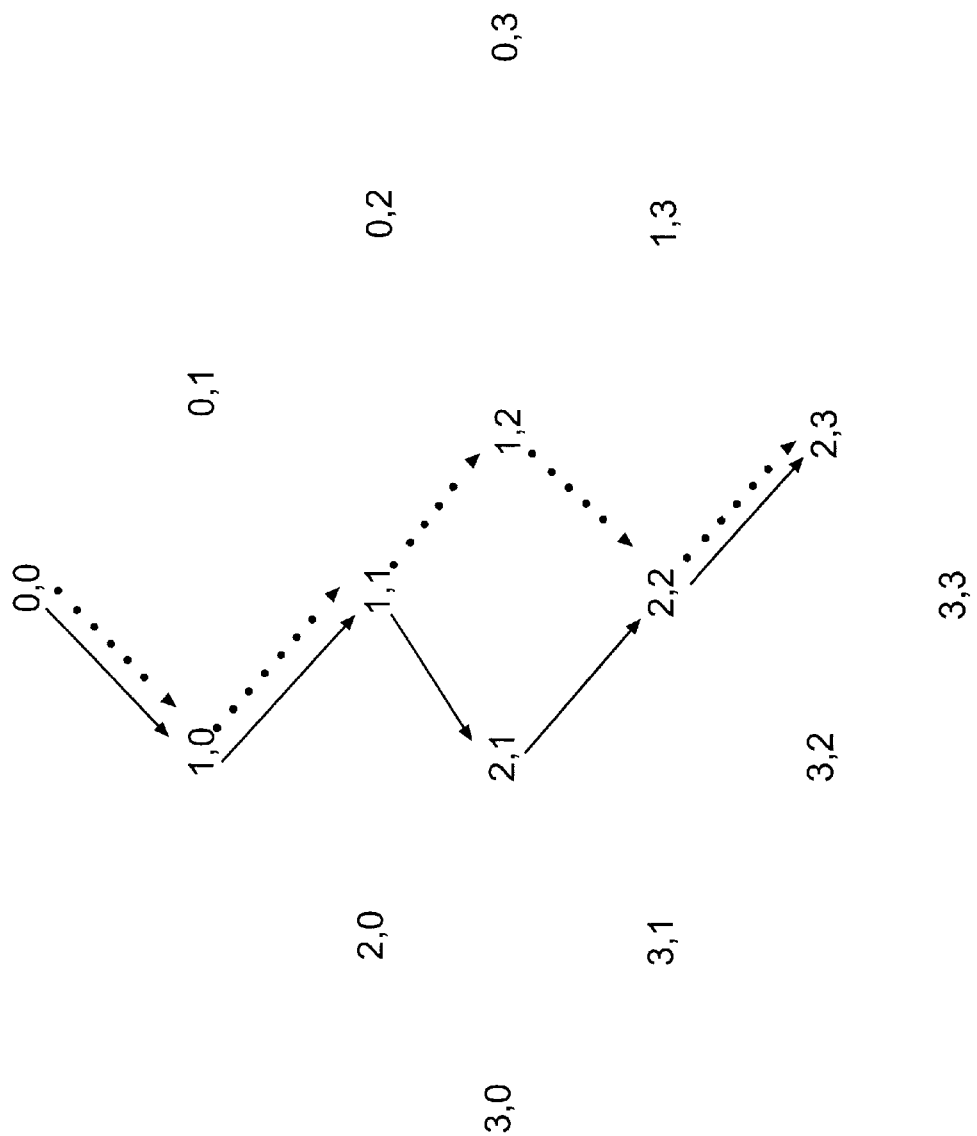
FIG. 6 is one embodiment of a state space for an applet and a pod while processing messages.

FIG. 6 is one embodiment of a state space for an applet and a pod while processing messages. Each node is labeled with the number of applet and pod messages processed when in that state. Solid lines indicate the applet path and dotted lines indicate the pod path. For example, if the applet is in state (2,3), the applet has processed two of its own messages and three messages from the corresponding pod. In the example of FIG. 6, a conflict occurs starting from state (1,1).

As messages are processed, the applet and pod move through the state space of FIG. 6. If the applet and pod process messages in the same order, no conflicts occur and the applet and pod take the same path (e.g., (0,0) to (1,0) to (1,1)). In the example, of FIG. 6, the applet and pod process different messages while in state (1,1). As a result, the applet moves to state (2,1) and the pod moves to state (1,2). To resolve the conflict of being in different states, both the applet and the pod process the message from the other party with the appropriate XFORM function.

Processing messages with the XFORM function moves both the applet and the pod to state (2,2). The applet and pod both process a message from the pod to move to state (2,3). Thus, as the applet and pod states diverge, the XFORM function(s) are used to reconcile the messages processed so that the applet and the pod move to the same state.

The messaging protocol of the present invention labels each message with the state of the sender just prior to when the message was generated. These labels are used to detect conflicts and the XFORM function(s) are used to resolve the conflicts. The messaging protocol guarantees that when an applet and pod reach the same state, all objects will have identical values.

The XFORM function takes a pair of applet and pod messages that were generated from the same starting state and returns transformed messages that allow the applet and the pod to reach the same final state. When the applet and pod diverge by only a single state the XFORM function can be used directly. However, when the applet and pod diverge by more than one state, reconciliation is more complex and the XFORM function cannot be used directly.

Figure 7:
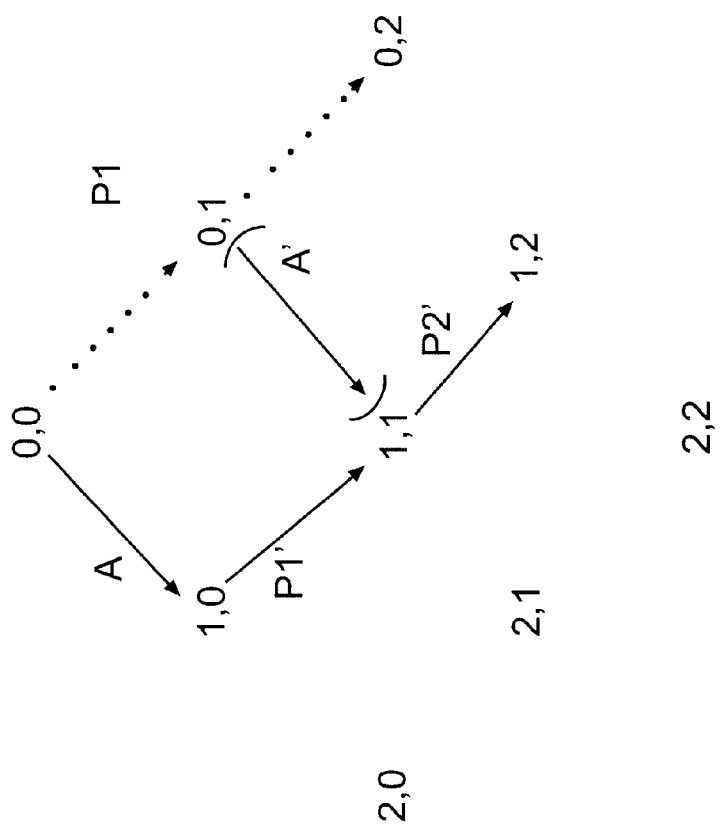
FIG. 7 is one embodiment of a state space in which an applet and a pod diverge by more than one step.

FIG. 7 is one embodiment of a state space in which an applet and a pod diverge by more than one state. In the example of FIG. 7, the applet has executed A to move to state (1,0) then receives a conflicting P1 message from the pod. The applet uses the XFORM function to generate P1' to get to state (1,1)

The pod then generates P2 from state (0,1), which indicates that the pod has not yet processed A. The applet cannot use XFORM(A, P2) because A and P2 were not generated from the same starting state. For example using the XFORM function described above, if A is DEL__4, P1 is DEL__1, and P2 is DEL__3, then the correct transform for P2 is NO__OP; however XFORM(A, P2) is DEL__3.

In the example of FIG. 7, when the applet computes P1', it also computes and stores A', both of which are returned by the XFORM function. A' represents a hypothetical message that the applet would have generated to move from state (0,1) to (1,1).

When P2 arrives, the applet uses A' to compute XFORM (A', P2)={A", P2'}. The applet executes P2' to get to state (1,2). If the pod has processed the applet's message, the pod will be in state (1,2) also. If not, the next message will originate from (0,3), not shown in FIG. 7. For this reason, the applet stores A". This process continues until the applet and the pod are in the same state.

Figure 8:
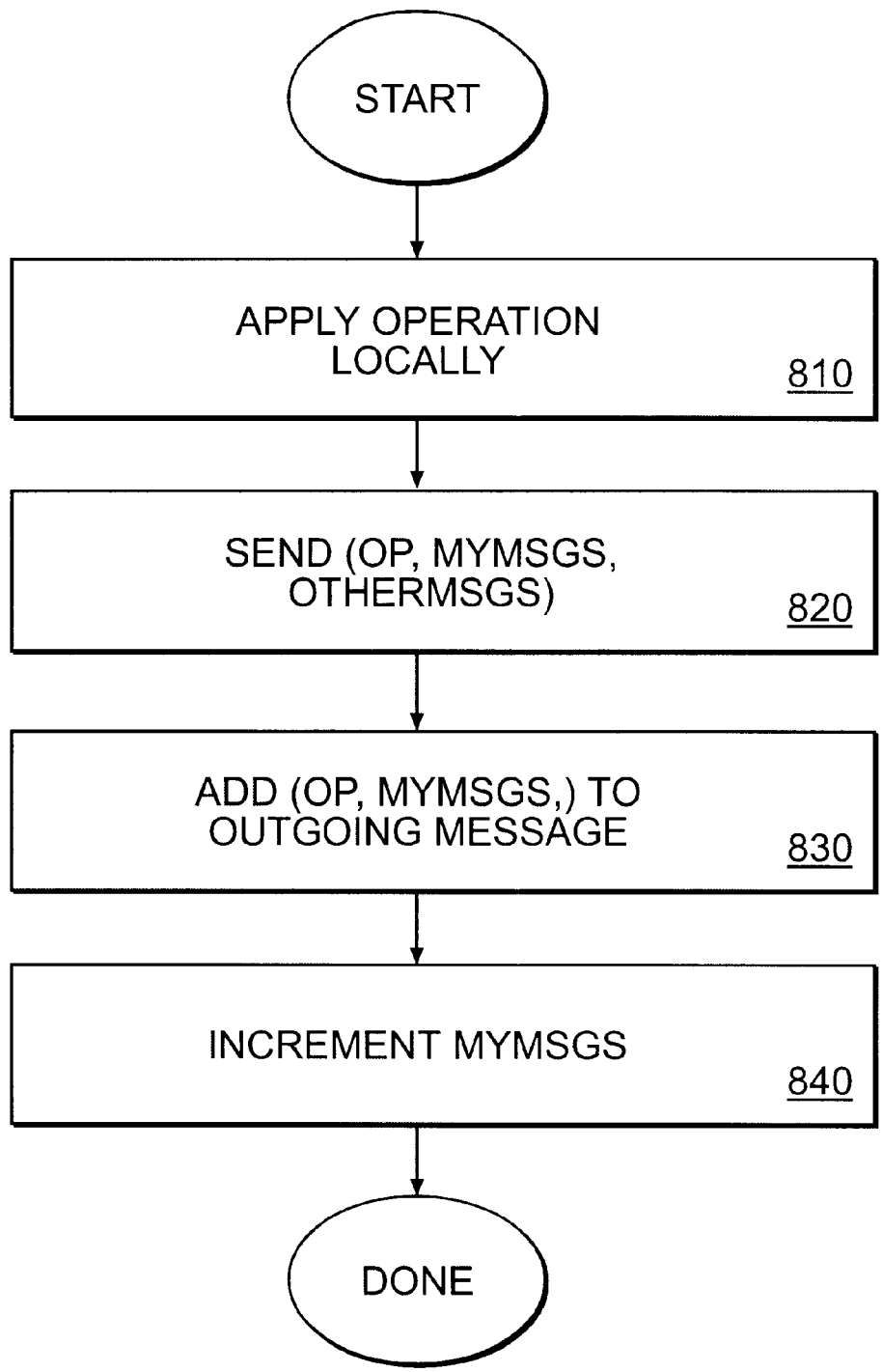
FIG. 8 is one embodiment of a flow diagram for sending a message.

FIG. 8 is one embodiment of a flow diagram for sending a message. The message is described in terms of being sent from an applet to a pod; however, messages sent from the pod to the applet are processed in the same manner. For purposes of explanation, the example of FIG. 8 assumes that the pod was last known in state (x, y) and has sent k messages, leaving the pod in state (x+k, y). These messages are kept in the outgoing queue. In the flow diagrams of FIGS. 8 and 9, MyMsgs refers to the number of messages processed by the generating object and OtherMsgs refers to the number of messages received and processed. For the applet, MyMsgs is x+k and OtherMsgs is y.

In step 810 the operation is performed locally by the applet to move the applet to state (x+k, y+1). In step 820, the operation along with MyMsgs and OtherMsgs is sent to the pod. In step 830, the message sent to the pod is added to the outgoing message queue of the applet. In step 840, MyMsgs is incremented.

Figure 9:
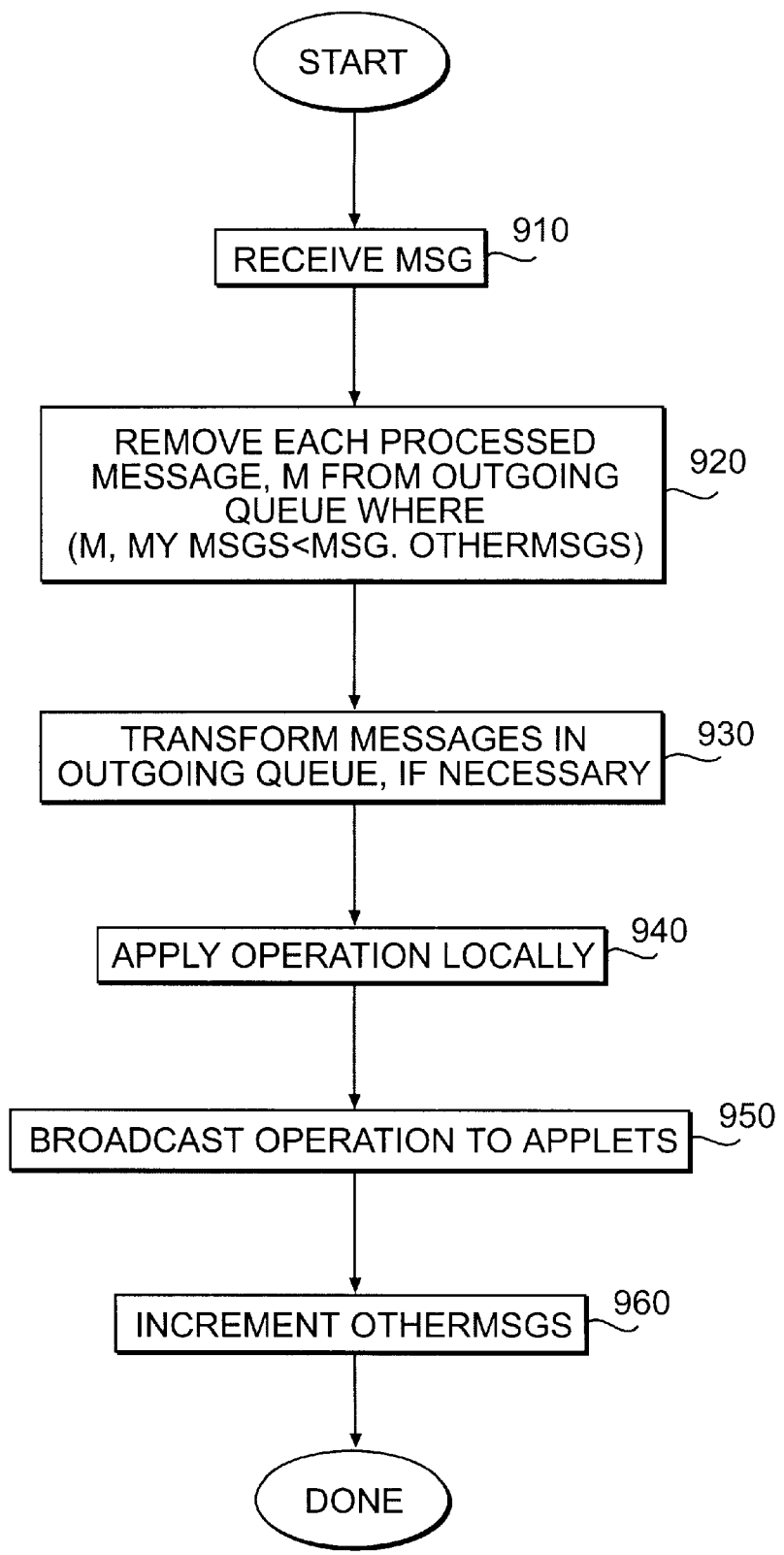
FIG. 9 is one embodiment of a flow diagram for receiving a message.

FIG. 9 is one embodiment of a flow diagram for receiving a message. The example of FIG. 9 assumes the same starting state as the example of FIG. 8. Thus, the next message received must originate from one of the states between (x, y) and (x+k, y), inclusive. Assuming that the pod has processed an arbitrary number (i) of the k applet messages, the received message comes from state (x+i, y), which takes the pod to state (x+i, y+1).

In step 910 a message is received. Step 920 operates to remove the messages saved by the applet that take the applet from state (x, y) to (x+i, y) because those messages have been processed by the pod and are no longer necessary to implement hypothetical messages to reconcile divergent states. In step 930, the incoming message is transformed, if necessary, with respect to the saved messages as described above. In one embodiment, any messages transformed are saved as transformed messages.

The result of step 930 is a message that takes the applet from state (x+k, y) to (x+k, y+1). In step 940 the message resulting from step 930 is applied locally. In step 950, the operation is broadcast to corresponding active applets. In step 960, OtherMsgs is incremented. The steps of FIG. 9 result in a saved sequence of messages that takes the applet from the last known pod state, (x+i, y+1) to the current state, (x+k, y+1).

In one embodiment, messages are saved until the messages are acknowledged by the corresponding pod/applet in order to transform incoming messages properly. Acknowledgements can be piggy-backed on outgoing messages. If messages are one-sided, explicit acknowledgements can be generated.

By applying concurrency control between an applet and a pod and having the pod broadcast incoming messages to other applets, a two-way concurrency control protocol can be used to provide n-way concurrency control. Each applet individually communicates messages that are processed via a two-way protocol and the results are broadcast to other applets behaving in the same manner.

SUMMARY

Optimistic concurrency control is well suited for use with lightweight asynchronous messaging because the applet/pod generating a message is free to continue operation without waiting for a response from the receiving pod/applet. Thus, combination of optimistic concurrency control and lightweight asynchronous messaging provides objects with more natural, real-time response than would otherwise be possible.

Collaborative objects allow intelligence to be included in the applets so that operations can be performed without generating messages to a pod. Thus, collaborative objects further improve the natural, real-time response that can be provided by objects as compared to the prior art. Transparent object serialization provides persistence that allows a user to use an object without the need to manually save or otherwise be concerned with saving the state of an object. Transparent object serialization can also reduce data losses should computer systems crash or otherwise lose state that has not been saved.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A collaborative object architecture comprising:
    a server system adapted to execute a pod having a plurality of constituent parts; and
    a plurality client systems coupled to the server system, the client systems each adapted to execute at least one applet having a plurality of constituent parts, the pod and the applets together comprising a collaborative object, wherein the pod plurality of constituent parts correspond to the applet plurality of constituent parts such that a change to one of the applet plurality of constituent parts causes a change to a corresponding constituent part in the pod;
    wherein the applets receive input, generate one or more messages to the pod in response to the input, and apply the input locally without waiting for a response from the pod, and further wherein the pod is adapted to receive message packets from multiple applets, determine an order in which to process the received message packets and communicate a set of data resulting from processing to the multiple applets such that the multiple applets receive the set of data from messages originating from the pod.

2. The architecture of claim 1, wherein the applet generates a message packet to the pod comprising multiple messages, and further wherein the messages are optimized to reduce non-essential data included in each message.

3. The architecture of claim 1, wherein data controlled by the pod is serialized and stored on a data storage device if a message packet is not received by the pod for a preselected period of time.

4. The architecture of claim 1, wherein the pod receives message packets from the applet and communicates the packets to additional applets.

5. A method comprising:
    executing a pod having a first plurality of constituent parts on a server system coupled to a plurality of clients systems:
        a first client system adapted to execute a first applet having a second plurality of constituent parts; and
        a second client system adapted to execute a second applet having a third plurality of constituent parts;
    receiving, at the pod, a first message from one of the second plurality of constituent parts indicating a change to data controlled by the first plurality of constituent parts;

receiving, at the pod, a second message from one of the third plurality of constituent parts indicating a change to data controlled by the first plurality of constituent parts;

processing at the pod, the plurality of messages by:
determining an order in which to process the received messages; and
communicating a set of data resulting from the processing to the second and third plurality of constituent parts, wherein the first and second applets continue execution prior to processing the messages.

6. The method of claim 5, wherein receiving a message comprises receiving a message packet having multiple messages indicating changes to data controlled by the constituent part.

7. The method of claim 5, wherein the update comprises multiple messages, and further wherein the messages are optimized to reduce non-essential data included in each message.

8. A computer readable medium having stored thereon sequences of instructions which when executed cause one or more electronic systems to:

execute a pod having a first plurality of constituent parts on a server system coupled to a plurality of clients systems:
a first client system adapted to execute a first applet having a second plurality of constituent parts; and
a second client system adapted to execute a second applet having a third plurality of constituent parts;

receive, at the pod, a first message from at least one of the second plurality of constituent parts indicating a change to data controlled by the first plurality of constituent parts;

receive, at the pod, a second message from at least one of the second plurality of constituent parts indicating a change to data controlled by the first plurality of constituent parts:

process, at the pod, the plurality of messages by:
determining an order in which to process the received messages; and
communicating a set of data resulting from the processing to first and second applets, wherein the first and second applets continue execution prior to processing the messages.

9. The computer readable medium of claim 8, wherein the sequences of instructions further comprise sequences of instructions that, when executed, cause the one or more electronic systems to receive a message packet having multiple messages indicating changes to data controlled by the constituent part.

10. The computer readable medium of claim 8, wherein the update comprises multiple messages, and further wherein the messages are optimized to reduce non-essential data included in each message.

11. A method comprising:

executing one of a plurality of applets having a first plurality of constituent parts;

receiving an input that indicates a change to data controlled by one of the first plurality of constituent parts within the applet;

applying the input to the data controlled by one of the first plurality of constituent parts within the applet;

generating a message indicating a change to the data;

sending the message to a pod having a constituent part corresponding to a constituent part of the first plurality of constituent parts within the applet, wherein the pod determines an order in which to process all the received messages; and communicates the change to the other applets; and continuing to execute the applet without waiting for a response from the pod.

12. The method of claim 11, wherein generating a message comprises generating multiple messages, and further wherein the messages are optimized to reduce non-essential data included in each message.

13. The method of claim 11, further comprising:

receiving an update from the pod indicating changes to the data;

transforming the update, if necessary, based on the state of the pod when the update is generated; and modifying the data based on the update.

* * * * *

UNITED STATES PATENT AND TRADEMARK OFFICE
CERTIFICATE OF CORRECTION

PATENT NO. : 6,338,086 B1                                              Page 1 of 1
DATED      : January 8, 2002
INVENTOR(S) : Pavel Curtis, Michael D. Dixon and David A. Nichols It is certified that error appears in the above-identified patent and that said Letters Patent is hereby corrected as shown below:

Column 12,
Line 26, "a plurality client" should read -- a plurality of client --.
Line 58, "clients" should read -- client --.

Column 13,
Line 5, "processing at" should read -- processing, at --.
Line 24 "clients" should read --- client --.
Line 38, "parts:" should read -- parts; --.

Signed and Sealed this

Twenty-third Day of April, 2002

Attest:

Attesting Officer

JAMES E. ROGAN
*Director of the United States Patent and Trademark Office*